(12) United States Patent
Gruenberger et al.

(10) Patent No.: US 12,383,961 B2
(45) Date of Patent: Aug. 12, 2025

(54) POWDER DISCHARGE MODULE FOR AN ADDITIVE MANUFACTURING APPARATUS, ADDITIVE MANUFACTURING APPARATUS AND METHOD OF APPLYING A POWDER LAYER

(71) Applicant: EOS GmbH Electro Optical Systems, Krailling (DE)

(72) Inventors: Stefan Gruenberger, Munich (DE); Stefan Kneisel, Munich (DE); Gabriel Schneider, Kempten (DE); Stefanie Markl, Munich (DE); Stefan Paternoster, Andechs (DE)

(73) Assignee: EOS GmbH Electro Optical Systems, Krailling (DE)

( * ) Notice: Subject to any disclaimer, the term of this patent is extended or adjusted under 35 U.S.C. 154(b) by 656 days.

(21) Appl. No.: 17/597,438

(22) PCT Filed: Jun. 24, 2020

(86) PCT No.: PCT/EP2020/067709
§ 371 (c)(1),
(2) Date: Jan. 6, 2022

(87) PCT Pub. No.: WO2021/004794
PCT Pub. Date: Jan. 14, 2021

(65) Prior Publication Data
US 2022/0266346 A1  Aug. 25, 2022

(30) Foreign Application Priority Data

Jul. 9, 2019 (DE) .......................... 102019210120.8

(51) Int. Cl.
*B22F 12/52* (2021.01)
*B22F 10/28* (2021.01)
(Continued)

(52) U.S. Cl.
CPC .............. *B22F 12/52* (2021.01); *B22F 10/28* (2021.01); *B22F 12/70* (2021.01); *B29C 64/153* (2017.08);
(Continued)

(58) Field of Classification Search
CPC .......... B22F 12/52; B22F 10/28; B22F 12/70; B22F 2999/00; B22F 12/90;
(Continued)

(56) References Cited

U.S. PATENT DOCUMENTS

2005/0074550 A1  4/2005  Leuterer et al.
2007/0298182 A1  12/2007  Perret et al.
(Continued)

FOREIGN PATENT DOCUMENTS

CN    108407299 A    8/2018
DE    10105504       8/2002
(Continued)

OTHER PUBLICATIONS

PCT International Search Report for Application No. PCT/EP2020/067709, dated Oct. 6, 2020, 3 pages.
(Continued)

*Primary Examiner* — Rebecca Janssen
(74) *Attorney, Agent, or Firm* — Polsinelli PC (57) ABSTRACT

A powder discharge module serves for a recoating device of an additive manufacturing device. A powder discharge module has a powder container for receiving the building material in powder form, and the powder container includes a supply opening for supplying the building material in powder form to the powder container and a discharge section facing the working plane, the discharge section having at least a first discharge device for discharging building material in powder form and at least one fluidization zone for fluidizing the building material in powder form using a gas
(Continued)

in the powder container. The powder container further includes a first flow reduction element provided in the powder container.

12 Claims, 5 Drawing Sheets

(51) Int. Cl.
  *B22F 12/70* (2021.01)
  *B29C 64/153* (2017.01)
  *B29C 64/255* (2017.01)
  *B29C 64/329* (2017.01)
  *B29C 64/371* (2017.01)
  *B33Y 10/00* (2015.01)
  *B33Y 30/00* (2015.01)
  *B33Y 40/00* (2020.01)

(52) U.S. Cl.
  CPC .......... *B29C 64/255* (2017.08); *B29C 64/329* (2017.08); *B29C 64/371* (2017.08); *B33Y 10/00* (2014.12); *B33Y 30/00* (2014.12); *B33Y 40/00* (2014.12)

(58) Field of Classification Search
  CPC . B22F 2202/15; B29C 64/153; B29C 64/255; B29C 64/329; B29C 64/371; B33Y 10/00; B33Y 30/00; B33Y 40/00; Y02P 10/25; B28B 1/001
  See application file for complete search history.

(56) References Cited

U.S. PATENT DOCUMENTS

| | | | |
|---|---|---|---|
| 2009/0206522 A1* | 8/2009 | Hein | B22F 10/322 |
| | | | 425/143 |
| 2018/0169946 A1 | 6/2018 | Paternoster et al. | |
| 2018/0361662 A1* | 12/2018 | Paternoster | B29C 64/343 |
| 2019/0091921 A1 | 3/2019 | Paternoster et al. | |
| 2019/0143601 A1 | 5/2019 | Jung et al. | |

FOREIGN PATENT DOCUMENTS

| | | | |
|---|---|---|---|
| DE | 102005016940 | 10/2006 | |
| DE | 102006053121 | 12/2007 | |
| DE | 102015225344 | 6/2017 | |
| DE | 102015225344 A1 * | 6/2017 | ............. B22F 10/20 |
| EP | 3243584 A1 | 11/2017 | |
| WO | 2014176045 | 10/2014 | |
| WO | 2017102242 | 6/2017 | |
| WO | 2019022759 | 1/2019 | |

OTHER PUBLICATIONS

German Search Report for Application No. DE2019210120.8, dated Jul. 4, 2020, 7 pages.

* cited by examiner

POWDER DISCHARGE MODULE FOR AN ADDITIVE MANUFACTURING APPARATUS, ADDITIVE MANUFACTURING APPARATUS AND METHOD OF APPLYING A POWDER LAYER

TECHNICAL FIELD OF THE INVENTION

The present invention relates to a powder discharge module for an apparatus for additively manufacturing a three-dimensional object by layer-wise applying and selectively solidifying of a building material in powder form, and to such an additive manufacturing apparatus, as well as to a method of applying at least one layer of a building material in powder form in the context of a method for manufacturing a three-dimensional object by layer-wise applying and selectively solidifying a building material in powder form, and to such an additive manufacturing method.

BACKGROUND OF THE INVENTION

Devices and methods of this type are used, for example, in rapid prototyping, rapid tooling or additive manufacturing. An example of such a method is known as "selective laser sintering or laser melting". In this method, a thin layer of the building material in powder form is repeatedly applied and in each layer the building material is selectively solidified by selectively irradiating positions that correspond to a cross-section of the object to be produced by means of a laser beam.

For example, in order to apply a layer of the building material in powder form, a recoating device provided in the apparatus is moved across a build area. During the movement of the recoating device across the build area, pulverulent building material is discharged through a discharge device of the recoating device, for example a discharge gap, and is drawn out by an application element of the recoating device to form a uniform layer. By introducing a gas into the building material stored in the recoating device, this material can be fluidized, i.e. put into a fluidized bed-like or fluid-bed-like or fluid-like state, in order to improve the powder discharge.

In particular at the beginning and the end of a layer application the recoating device, and thus also the powder stored in it, is subjected to an acceleration. Due to the acceleration forces that occur, the fluidized pulverulent building material provided in the recoating device is set in motion, which is also referred to as "swashing" of the building material. Such swashing of the building material, i.e. a chaotic and therefore difficult to control action of a turbulent flow of the fluid building material, can cause an uneven distribution of the building material in the recoating device, which can negatively affect the quality of the applied powder layer. In addition, swashing can cause undesirable forces on the powder container, which can also negatively affect the quality of the applied layer. Also, swashing and/or fluidization of the powder can cause fine powder particles to be discharged, which can lead to contamination of components of the recoating device and/or the manufacturing apparatus.

A powder discharge device for a recoating device is known from WO 2017/102242 A1, which comprises a powder container and a filling shaft formed separately from the powder container and communicating with the powder container via an opening in a partition wall. The building material in powder form can be fluidized in the powder container and in the filling shaft independently of one another.

SUMMARY OF THE INVENTION

It is an object of the present invention to provide an alternative or improved powder discharge module, or an alternative or improved additive manufacturing apparatus, or an alternative or improved method of applying at least one powder layer, or an alternative or improved additive manufacturing method, with which, in particular, a movement of the fluidized powder in the powder discharge module of the recoating device can be at least reduced and/or the building material in powder form can be fluidized better.

A powder discharge module according to the invention serves for a recoating device of an apparatus for additively manufacturing a three-dimensional object by layer-wise applying building material in powder form and selectively solidifying the applied layers at positions that correspond to the respective cross-section of the three-dimensional object in the respective layer, wherein for the layer-wise application of the building material the recoating device is provided in the apparatus so as to be movable in at least one direction of movement across a working plane of the apparatus. The powder discharge module has a powder container for receiving the building material in powder form. The powder container comprises a supply opening for supplying the building material in powder form to the powder container, a discharge section facing the working plane during the intended operation of the recoating device, the discharge section having at least a first discharge device for discharging building material in powder form and at least one fluidization zone for fluidizing the building material in powder form using a gas in the powder container, and at least a first flow reduction element provided in the powder container.

The powder discharge module can, for example, be formed integrally with the recoating device or can be provided interchangeably on it. The powder discharge module and/or the recoating device can, for example, further comprise at least one recoating element, e.g. an application roller and/or an application blade and/or a flexible application element, e.g. a flexible rubber lip or a brush, which is arranged behind the discharge device in the direction of movement of the recoating device in order to draw out the pulverulent building material discharged by the discharge device to form a uniform layer and/or to compact an applied layer.

Preferably, the discharge section is a region of the powder container that closes the powder container downward, i.e. in the direction of the working plane or the build area, during the intended operation of the recoating device or the intended use of the powder discharge module. The discharge section of the powder container can be, for example, a container bottom of the powder container, i.e. the entire container bottom or one or more zones of the container bottom. However, it can also be another region of the powder container, for example, in the vicinity of the container bottom, such as an intermediate bottom, which substantially faces the build area or the working plane during the intended operation of the recoating device or the intended use of the powder discharge module. The intended use of the powder discharge module preferably means a state and/or an arrangement or position of the powder discharge module in the additive manufacturing apparatus or in the recoating device, in which the powder discharge module is suited to discharge building material in powder form for application of a layer, i.e. in particular is moved with the recoating device across the build area or the working plane.

An intended operation of the recoating device preferably means a state of the recoating device in which it is arranged and/or positioned and/or controlled in the additive manufacturing apparatus in such a way that it is at least suitable for applying at least one layer of the pulverulent building material in the working plane or onto the build area, in particular in accordance with a method according to the invention described in more detail below. The intended use of the powder discharge module preferably means a state in which the powder discharge module is suitably attached to or provided integrally with the recoating device and the recoating device is in its intended operation.

The at least one discharge device is configured to discharge the building material stored in the powder container, in particular downwards, i.e. in the direction of the working plane or the build area. The building material discharged in this way can then be drawn out to form a uniform layer, for example. The discharge device can be designed, for example, as a recess in the discharge section. Furthermore, one or several recoating elements, e.g. a slider and/or a metering roller, can be provided at the recess for partially and/or completely closing the recess. With such recoating elements it is possible, for example, to control the discharged powder quantity or a volumetric flow rate of the discharged powder.

The supply opening is preferably provided at a distance from a lateral wall of the powder container with respect to the direction of movement of the recoating device, in particular in a central region of the powder container with respect to the direction of movement. A closure element, such as a lid, is preferably further provided at the supply opening, by means of which the supply opening can be closed.

The at least one fluidization zone can be formed, for example, by a cavity in or outside the discharge section, which communicates with a supply line for supplying the gas and is separated from the interior of the powder container by a gas inlet element, for example a perforated plate and/or a porous plate. The holes or pores of the gas inlet element are preferably formed such that they allow the gas to pass through, but do not allow powder grains of the pulverulent building material to pass through. For example, by introducing a gas into the powder container, the powder stored therein can be fluidized, i.e. put into a fluidized bed-like or fluid-bed-like or fluid-like state. Preferably, the at least one fluidization zone serves to pass a gas into the powder container.

Preferably, here and in the following, a flow reduction element is meant to be a structural element which reduces a flow in the powder container, in particular a flow of the fluidized building material in the powder container, on average. The flow reduction element can have at least one powder opening (e.g. a hole), wherein the flow reduction element is to be understood in such a way that possibly the flow in the center of the hole passage is initially not influenced. The flow of the fluidized building material can generally be understood as a movement of the fluidized building material, i.e. of the building material that has been set to a fluidized bed-like or fluid-bed-like state. Such a movement can be caused in particular by an increase and/or decrease in speed, i.e. an acceleration, of the recoating device in the course of a layer application and is referred to as "swashing" of the fluidized building material when it has reached a chaotic quality in the sense of developing its own dynamics, i.e. can no longer be regulated by simple counter-control. Without acceleration, i.e. when the recoating device is at rest or moving at constant speed, the flow reduction element is preferably permeable, at least in sections, to the pulverulent building material. In this way, for example, when filling the powder container with building material and/or after a layer application, a distribution of the building material in the container can be made possible or improved. The at least one flow reduction element is preferably provided separately from and at a distance from a wall of the powder container and/or projects into the interior of the powder container. It preferably extends in the direction of movement of the recoating device at a thickness which is several times smaller than a longitudinal dimension and a height dimension of the flow reduction element, i.e. the flow reduction element is designed as a flat body with a small depth extension. For example, it can be formed as a thin plate or a thin sheet.

By providing at least one flow reduction element in the powder container, for example, swashing of the fluidized building material can be prevented or at least reduced. This can improve the distribution of the building material in the powder container and/or forces acting on the powder container, which are/would be caused by swashing building material, can be reduced.

Preferably, the powder container comprises the first flow reduction element at at least one upper container region, wherein the first flow reduction element extends substantially from the at least one upper container region toward the discharge section. Alternatively or in addition, the first flow reduction element preferably extends at least over 50%, more preferably over at least 70%, even more preferably over at least 90% of a distance of an upper container region from the discharge section. Alternatively or in addition, the first flow reduction element is preferably provided in the powder container at a distance from the discharge section.

The upper container region of the powder container is preferably defined by a boundary on the top side of the powder container, for example a container ceiling or a container intermediate ceiling. The distance of the upper container region from the discharge section can also be referred to as the height of the interior space of the powder container. The distance does not need to be the same in all regions of the powder container, but can vary, for example, across regions of the powder container. Therefore, the distance of the upper container region from the discharge section can also be a local distance, for example. Alternatively, the flow reduction element can extend over the entire distance of the upper container region from the discharge section. In this case, it abuts both the upper container region and the discharge section, i.e. it extends over the entire height of the interior space of the powder container. The term "upper container region" or "boundary on the top side" means a region or boundary of the powder container facing away from the working plane or the build area. Preferably, an interior space of the powder container is located between the discharge section and the upper container region of the powder container, and is at least partially limited by these.

By the height extent of the flow reduction element over at least 50% of the distance of the upper container region from the discharge section, for example, a sufficient effect of the flow reduction element can be achieved even with lower filling level heights.

Preferably, the first flow reduction element extends substantially in a longitudinal direction transverse, further preferably perpendicular, to the intended direction of movement of the recoating device and further preferably extends in the longitudinal direction substantially over an entire dimension of an interior space of the powder container.

Analogously, preferably the first and/or second discharge device, which is described in more detail below, and/or the supply opening and/or the at least one fluidization zone extends substantially in a longitudinal direction transverse, preferably perpendicular, to the intended direction of movement of the recoating device. Further preferably, the first and/or second discharge device (see below) and/or the supply opening and/or the at least one fluidization zone preferably extends in the longitudinal direction substantially over the entire dimension of the interior space of the powder container. The term "substantially" expresses that the respective element extends over at least 80% of the dimension of the interior space of the powder container in the longitudinal direction. This makes it possible, for example, to use as large an area of the powder container as possible for the powder supply or the powder discharge or the powder fluidization, or in the embodiment of the flow reduction element over substantially the entire length of the interior space of the powder container, a good reduction of the flow can be achieved, for example.

Preferably, the first flow reduction element comprises at least one, preferably a plurality of structures, wherein the structure(s) further preferably comprises one or a plurality of powder opening(s) penetrating the flow reduction element.

A "powder opening penetrating the flow reduction element" preferably means that the building material in powder form can pass through the powder opening from one side of the flow reduction element to the opposite side, in particular when the fluidized building material is subjected to substantially no acceleration. This can, for example, enable good distribution of the pulverulent building material in the powder container.

The flow reduction element can, for example, have structures other than holes or powder openings, for example, it can have one or more ribs and/or lamellas. In general, the structure(s) is/are preferably configured to reduce a flow in the powder container on average, as described above. Thus, for example, various possibilities are provided for forming the flow reduction element.

Further preferably, the at least one powder opening of the flow reduction element is designed as an adjustable and/or variable powder opening, i.e. the geometric shape and/or the opening area of the powder opening(s) is adjustable or variable. This can be realized, for example, by one or more cover provided at the powder opening, the cover(s) being configured to partially and/or completely close the at least one powder opening. By means of such adjustable or variable powder opening(s) of the flow reduction element, it is possible, for example, to use the powder container and the flow reduction element for different building materials in powder form, in particular building materials having different particle size distributions.

Alternatively or in addition, the powder openings are further preferably provided spaced from one another in the flow reduction element, even more preferably regularly spaced from one another, wherein the powder openings are preferably arranged in rows offset from one another.

The powder openings can be spaced from one another in a longitudinal direction and/or a height direction of the flow reduction element and/or diagonally spaced from one another. Alternatively or in addition, the arrangement of the powder openings can be symmetrical, for example in the longitudinal direction and/or the height direction. Further preferably, the powder openings are arranged in rows and/or in columns, in particular in mutually offset rows and/or columns.

Preferably, the powder openings are provided substantially over the entire extent of the flow reduction element along its height extent and/or substantially over the entire extent of the flow reduction element along its longitudinal extent, the vertical extent and the longitudinal extent of the flow reduction element each being transverse, preferably perpendicular, to the direction of movement of the recoating device.

The powder openings are preferably designed and arranged such that building material in powder form can pass through the powder openings at least when the recoating device is at a standstill and/or the recoating device is moving at a constant speed. For example, the powder openings can have an opening diameter or a maximum dimension of the opening that is at least one hundred times a grain diameter associated with the powder grains of the building material, for example a maximum grain diameter or a grain diameter of a defined characteristic value of the powder size distribution. An opening diameter of the powder openings can, for example, be in the range between 5 mm and 10 mm. An average grain diameter of the pulverulent building material can, for example, be in the range of 50 µm+/−20% deviation.

The closed regions, i.e. regions not penetrated by powder openings, of the flow reduction element are preferably dimensioned such that a flow in the powder container is at least reduced. For example, a ratio of the total opening area of all powder openings to the remaining closed area of the flow reduction element can be at least 30% and/or at most 40%, preferably between 30% and 40%.

By means of the flow reduction element designed this way, which is also called a baffle or baffle plate, a movement (swashing) of the fluidized building material in the powder container can be particularly well reduced, for example.

Preferably, at least a second flow reduction element is provided in the powder container, which further preferably has an orientation corresponding to that of the first flow reduction element in the powder container, even more preferably is arranged parallel to this first flow reduction element. The first and the second flow reduction elements are preferably designed and/or arranged in the powder container so that in a projection of the first flow reduction element onto the second flow reduction element the powder openings of the first and of the second flow reduction elements are offset from one another at least in sections thereof. Alternatively or in addition, the first flow reduction element and the second flow reduction element are preferably arranged in the powder container spaced apart from one another in the direction of movement of the recoating device and the supply opening of the powder container is provided between the flow reduction elements in the direction of movement of the recoating device.

This makes it possible, for example, to reduce the flow in the powder container particularly well. By providing a second flow reduction element in the powder container, wherein the supply opening is provided in an area between the two flow reduction elements, it is also possible, for example, to achieve a functional separation of the interior space of the container, which is further favored by providing various fluidization zones described below. The staggered perforation of the two flow reduction elements in relation to one another can, for example, reduce or prevent the formation of powder waves during the acceleration phases of the recoating device and/or enable rapid and/or homogeneous powder distribution in the interior space of the powder container.

Preferably, in a first region of the discharge section, which is a region of the discharge section adjacent to the first discharge device, a first discharge fluidization zone is provided for fluidizing the building material in powder form using a gas in the powder container and/or in a second region of the discharge section, which is a region of the discharge section spaced from the first discharge device, a central fluidization zone is provided for fluidizing the building material in powder form using a gas in the powder container.

By providing different fluidization zones, it is possible, for example, to fluidize the pulverulent building material in the powder container locally differently, i.e. corresponding to the first and second regions of the discharge section, or to fluidize it only in one of the regions. In contrast to a large-area fluidization of the building material, less building material is thus fluidized in total, which can lead to a lower discharge of fine (or finest) powder portions and/or reduce or prevent a flow or swashing of the fluidized building material in the powder container. For this purpose, the discharge fluidization zone and the central fluidization zone are preferably designed as two zones controllable independently of one another. Two independently controllable fluidization zones means in particular that a volumetric flow rate of the gas introduced into the powder container through the respective fluidization zone can be set independently of the other fluidization zone. A volumetric flow rate of the introduced gas can also be zero. Furthermore, providing different fluidization zones makes it possible, for example, to assign different tasks or functions to the different fluidization zones. For example, the fluidization zones can be activated in a specific sequence and/or have a different flow rate and/or a different activation frequency and/or a different activation duration. This can, for example, increase the flexibility of the powder discharge module or of a method of applying at least one powder layer that can be carried out with it.

Further preferably, the powder container comprises at least one upper container region at which the supply opening is provided, wherein in a projection of the at least one upper container region onto the discharge section, the supply opening is more preferably provided substantially in a region of the central fluidization zone.

This makes it possible, for example, to specifically sectionally fluidize the building material in the powder container, in accordance with different process steps, such as a filling step, in which building material is supplied to the powder container through the supply opening, and/or an application step, in which a layer of the building material in powder form is applied to the build area or in the working plane.

Alternatively or in addition, the discharge section more preferably further comprises a second discharge device, wherein in a third region of the discharge section, which is a region of the discharge section adjacent to the second discharge device, a second discharge fluidization zone is provided for fluidizing the building material in powder form using a gas in the powder container. More preferably, the first and second discharge sections are spaced apart from one another in the direction of movement and the first and second discharge fluidization zones are provided between the two discharge sections. More preferably, alternatively or in addition, the central fluidization zone is provided between the first and second discharge fluidization zones.

By providing a second discharge device it is possible, for example, to apply successive (partial) layers of the building material in the recoating direction and its opposite direction, wherein for applying a first (partial) layer the pulverulent building material is discharged by one of the two discharge devices and for applying a second (partial) layer the pulverulent building material is discharged by the other one of the two discharge devices.

Preferably, the first and/or second discharge device comprises a discharge opening, in particular a slit-shaped discharge opening, which extends in the direction of the build area or the working plane over a thickness of the discharge section, wherein the discharge opening is funnel-shaped at least in a section and/or has at least one discharge opening fluidization zone. Further preferably, a longitudinal direction of the slit-shaped discharge opening extends transverse, in particular perpendicular, to the direction of movement of the recoating device. With such a discharge opening, in particular a slit-shaped discharge opening, a discharge device that is easy to implement is provided, for example. By providing at least one discharge opening fluidization zone at the discharge opening, for example, the powder discharge can be further improved, in particular bridging, i.e. clogging of the discharge opening, can be prevented. By providing an at least sectionally funnel-shaped section, the powder discharge can be improved, for example.

Preferably, at least one of the fluidization zones comprises a porous plate and/or a perforated plate having a plurality of gas outlet openings, wherein the gas outlet openings are designed to be permeable to the gas, but not permeable to powder, wherein the porous plate or the perforated plate is further preferably made of a metal and/or has been manufactured in an additive manufacturing method by layer-wise selective solidification of a building material. Further preferably, the porous plate and/or perforated plate is designed as a replaceable insert, particularly preferably as a unit with a chamber. The chamber serves to receive a supplied gas before it flows through the porous plate and/or perforated plate into the interior space of the powder container. The insert is preferably sealed off from the discharge section and/or further fluidization zones by means of one or more sealing elements. This makes it possible, for example, to remove and/or replace the insert for cleaning purposes and/or when using a different building material.

Preferably, at least one of the fluidization zones comprises a control device for adjusting a volumetric flow rate through the at least one fluidization zone. In other words, the control device is preferably configured to adjust a volumetric flow rate of the gas flowing into the powder container through the fluidization zone during operation. This makes it possible, for example, to set the volumetric flow rate of the gas through the fluidization zone into the powder container independently of other fluidization zones of the powder container, and thus to generate a local fluidization of the building material, which can be controlled by the control device. The control device can be designed, for example, as a mass flow controller (MFC) and/or as at least one switchable valve.

A powder discharge module according to a further aspect serves for a recoating device of an apparatus for additively manufacturing a three-dimensional object by layer-wise applying building material in powder form and selectively solidifying the applied layers at positions corresponding to the respective cross-section of the three-dimensional object in the respective layer, wherein for the layer-wise application of the building material the recoating device is provided in the apparatus so as to be movable in at least one direction of movement across a working plane of the apparatus. The powder discharge module has a powder container for receiving the building material in powder form and the powder container comprises a supply opening for supplying the building material in powder form to the powder container and a discharge section facing the working plane during the intended operation of the recoating device, the discharge section having at least a first discharge device for discharging building material in powder form, wherein in a first region of the discharge section, which is a region of the discharge section adjacent to the first discharge device, a discharge fluidization zone is provided for fluidizing the building material in powder form using a gas in the powder container and/or in a second region of the discharge section, which is a region of the discharge section spaced from the first discharge device, a central fluidization zone is provided for fluidizing the building material in powder form using a gas in the powder container. Preferably, the powder discharge module further comprises at least a first flow reduction element provided in the powder container, wherein further preferably the powder container comprises the flow reduction element at at least one upper container region, and/or wherein the flow reduction element substantially extends from the at least one upper container region toward the discharge section, and/or wherein the flow reduction element comprises at least one, preferably a plurality of flow reducing structures, preferably powder openings penetrating the flow reduction element.

With such a powder discharge module it is possible, for example, to fluidize the pulverulent building material in the powder container in different regions, in particular independently of one another. The powder discharge module according to the further aspect can be further developed by the features of the powder discharge module according to the invention, which features are described above and in the dependent claims.

An apparatus according to the invention serves for additively manufacturing a three-dimensional object by layer-wise applying building material in powder form and selectively solidifying the applied layer at positions that correspond to the respective cross-section of the three-dimensional object in the respective layer, and comprises a recoating device which is provided in the apparatus so as to be movable in at least one direction of movement across a working plane of the apparatus in order to layer-wise apply the building material, wherein the recoating device comprises an above-described powder discharge module according to the invention and/or a powder discharge module according to the further aspect described above. This makes it possible, for example, to achieve the effects described above with regard to the powder discharge module also in an additive manufacturing apparatus.

According to the invention, a method of applying at least one layer of a building material in powder form can be carried out or is carried out in an apparatus for additively manufacturing a three-dimensional object by layer-wise applying building material in powder form and selectively solidifying the applied layers at positions corresponding to the respective cross-section of the three-dimensional object in the respective layer, wherein a recoating device for applying a layer of the building material in powder form is moved in at least one direction of movement across a working plane of the apparatus, wherein the recoating device comprises a powder discharge module and wherein the powder discharge module has a powder container that receives building material in powder form. The powder container comprises a supply opening for supplying the building material in powder form to the powder container, a discharge section facing the working plane during the intended operation of the recoating device, the discharge section having at least a first discharge device for discharging building material in powder form and at least one fluidization zone for fluidizing the building material in powder form using a gas in the powder container, and at least a first flow reduction element provided in the powder container. Preferably, the powder discharge module in a first region of the discharge section, which is a region of the discharge section adjacent to the first discharge device, comprises a discharge fluidization zone for fluidizing the building material in powder form using a gas in the powder container, and in a second region of the discharge section, which is a region of the discharge section spaced from the first discharge device, comprises a central fluidization zone for fluidizing the building material in powder form using a gas in the powder container, wherein gas is introduced into the powder container at least temporarily through the discharge fluidization zone and/or the central fluidization zone. Preferably, in the method, at least temporarily pulverulent building material is discharged by the first discharge device, and at least temporarily gas is introduced into the powder container through at least one of the fluidization zones described above. This makes it possible, for example, to achieve the effects described above with respect to the powder discharge module also in a method of applying at least one powder layer.

Preferably, prior to moving the recoating device across the working plane and/or across the build area, a filling step is performed in which pulverulent building material is supplied through the supply opening to the powder container and in which gas is introduced into the powder container at least through the central fluidization zone, preferably through the central fluidization zone and the discharge fluidization zone, wherein in the filling step pulverulent building material is supplied up to a predetermined filling level height in the powder container, which is preferably detected by means of a light barrier. By introducing a gas through the central fluidization zone the building material can be fluidized in a central area of the powder container with respect to the recoating direction, in which the supply opening is preferably provided, thus enabling, for example, a better distribution of the building material in the powder container. The distribution of the building material in the powder container can also be further improved by introducing the gas through the discharge fluidization zone(s) to fluidize the building material in these areas.

By setting a filling level height of the pulverulent building material to be achieved in the powder container it is possible, for example, to supply a reproducible powder quantity to the powder container or to achieve a reproducible powder quantity in the powder container. Alternatively or in addition, independently of the filling step, a filling level height detection step can be carried out, in which a current filling level height of the pulverulent building material in the powder container is detected, for example by the light barrier.

Preferably, during the movement of the recoating device across the working plane or across the build area gas is introduced into the powder container at least through the discharge fluidization zone, wherein gas is introduced through the central fluidization zone at a lower volumetric flow rate than through the discharge fluidization zone and/or substantially no gas is introduced through the central fluidization zone into the powder container. By fluidizing the building material in the region of the discharge device, i.e. by introducing the gas through the discharge fluidization zone into the powder container, a homogeneous powder discharge can be achieved, for example. In contrast to maximum fluidization, where gas is also introduced through the central fluidization zone at a large volumetric flow rate, for example in the filling step described above, reducing the volumetric flow rate of the central fluidization zone means that less building material is fluidized overall, which can reduce the proportion of fine (or finest) powder discharge and/or swashing of the building material, in particular in a subsequent step of slowing down (decelerating) the recoating device.

As described below, the fluidization zones or the volumetric flow rates of the gas flowing through the respective fluidization zones are preferably switchable or controllable independently of one another. Such control can be performed, for example, depending on a currently performed function of the recoating device (e.g. filling or layer application) and/or depending on an acceleration of the recoating device (e.g. no acceleration, i.e. the recoating device rests or moves at a substantially constant speed, or the recoating device is accelerated (positive acceleration, i.e. speed increase, or negative acceleration, i.e. speed decrease)).

By the specific control of the fluidization zones as described below it is possible, for example, to keep a period of maximum fluidization (by all fluidization zones) as short as possible, for example only during filling of the powder container, and thus to reduce or minimize the discharge of fine (or finest) powder discharge. For example, a filling process can take only a fraction of the time span of a recoating process and/or irradiation process.

In general, it should also be noted that when controlling the individual fluidization zones, at least one fluidization zone can be deactivated, i.e. no gas is introduced through this fluidization zone (volumetric flow rate is zero), or that the at least one fluidization zone is only operated at a reduced level, i.e. so little gas (small volumetric flow rate) is introduced through the fluidization zone that the building material is only fluidized to a very small extent, in particular if (depending on the material) deactivation should lead to more difficult restoring of a fluidized bed. The deactivation can, for example, cause the formation of a compacted static bed (also referred to as a powder plug).

Preferably, during a reduction and/or an increase in the speed of the recoating device, the volumetric flow rate of the gas introduced into the powder container through the discharge fluidization zone and/or the central fluidization zone is reduced. Alternatively or in addition, when the discharge device begins to discharge the pulverulent building material, preferably the volumetric flow rate of the gas introduced into the powder container through the discharge fluidization zone and/or the central fluidization zone is increased. By reducing the volumetric flow rate when the speed of the recoating device is reduced and/or increased, i.e. in general an acceleration, swashing of the pulverulent building material in the powder container can be reduced or prevented, for example. By increasing the volumetric flow rate at the beginning of the powder discharge, for example, an improved (initial) powder discharge can be achieved.

According to a further aspect, a method of applying at least one layer of a building material in powder form is provided, which method can be carried out or is carried out in an apparatus for additively manufacturing a three-dimensional object by layer-wise applying building material in powder form and selectively solidifying the applied layers at positions corresponding to the respective cross-section of the three-dimensional object in the respective layer, wherein a recoating device for applying a layer of the building material in powder form is moved in at least one direction of movement across a working plane of the apparatus. The recoating device comprises a powder discharge module and the powder discharge module has a powder container that receives building material in powder form. The powder container comprises a supply opening for supplying building material in powder form to the powder container, and a discharge section facing the working plane during the intended operation of the recoating device, the discharge section having at least a first discharge device for discharging building material in powder form. In a first region of the discharge section, which is a region of the discharge section adjacent to the first discharge device, a discharge fluidization zone is provided for fluidizing the building material in powder form using a gas in the powder container, and/or in a second region of the discharge section, which is a region of the discharge section spaced from the first discharge device, a central fluidization zone is provided for fluidizing the building material in powder form using a gas in the powder container, and gas is introduced into the powder container at least temporarily through the discharge fluidization zone and/or the central fluidization zone. Preferably, the powder discharge module further comprises at least a first flow reduction element provided in the powder container, the powder container further preferably comprising the flow reduction element at at least one upper container region and/or wherein the flow reduction element substantially extends from the at least one upper container region toward the discharge section and/or wherein the flow reduction element comprises at least one, preferably a plurality of flow reducing structures, preferably powder openings penetrating the flow reduction element.

Thus, it is possible, for example, to achieve the effects described above with respect to the inventive method of applying at least one layer, or similar effects, also when using a powder discharge module without a flow reduction element. The method of applying at least one powder layer according to the further aspect can be further developed by the features of the inventive method of applying at least one powder layer, which features are described above and given in the dependent claims.

A manufacturing method according to the invention serves for additively manufacturing a three-dimensional object in an apparatus by layer-wise applying building material in powder form and selectively solidifying the applied layer at positions that correspond to the respective cross-section of the three-dimensional object in the respective layer, wherein an above-described method according to the invention and/or an above-described method according to the further aspect is carried out for applying at least one layer of the building material.

This makes it possible, for example, to achieve the effects described above with regard to the method according to the invention of applying at least one layer of the building material in powder form and/or the method of applying at least one layer of the building material in powder form according to the further aspect also in an additive manufacturing method.

A further method serves for controlling a recoating device and can be carried out or is carried out in an apparatus for additively manufacturing a three-dimensional object by layer-wise applying building material in powder form and selectively solidifying the applied layers at positions corresponding to the respective cross-section of the three-dimensional object in the respective layer, wherein the recoating device is controlled to move in at least one direction of movement across a working plane of the apparatus for applying a layer of the building material in powder form.

The recoating device comprises a powder discharge module, the powder discharge module having a powder container that receives building material in powder form. The powder container comprises a supply opening for supplying the building material in powder form to the powder container, and a discharge section facing the working plane during the intended operation of the recoating device. The discharge section has at least a first discharge device that is controlled such that it discharges building material in powder form at least temporarily. The discharge section further comprises at least one fluidization zone that is controlled such that it at least temporarily fluidizes building material in powder form using a gas in the powder container. The powder container further comprises at least a first flow reduction element provided in the powder container, and/or in a first region of the discharge section, which is a region of the discharge section adjacent to the first discharge device, a discharge fluidization zone is provided for fluidizing the building material in powder form using a gas in the powder container, and/or in a second region of the discharge section, which is a region of the discharge section spaced from the first discharge device, a central fluidization zone is provided for fluidizing the building material in powder form using a gas in the powder container, and wherein gas is introduced into the powder container at least temporarily through the discharge fluidization zone and/or the central fluidization zone. In particular, the recoating device can be controlled, or is controlled, to carry out an above-described method of applying at least one powder layer.

BRIEF DESCRIPTION OF THE DRAWINGS

Further features and expediencies of the invention will be apparent from the description of exemplary embodiments with reference to the accompanying drawings.

DETAILED DESCRIPTION OF THE EMBODIMENTS

Figure 1:
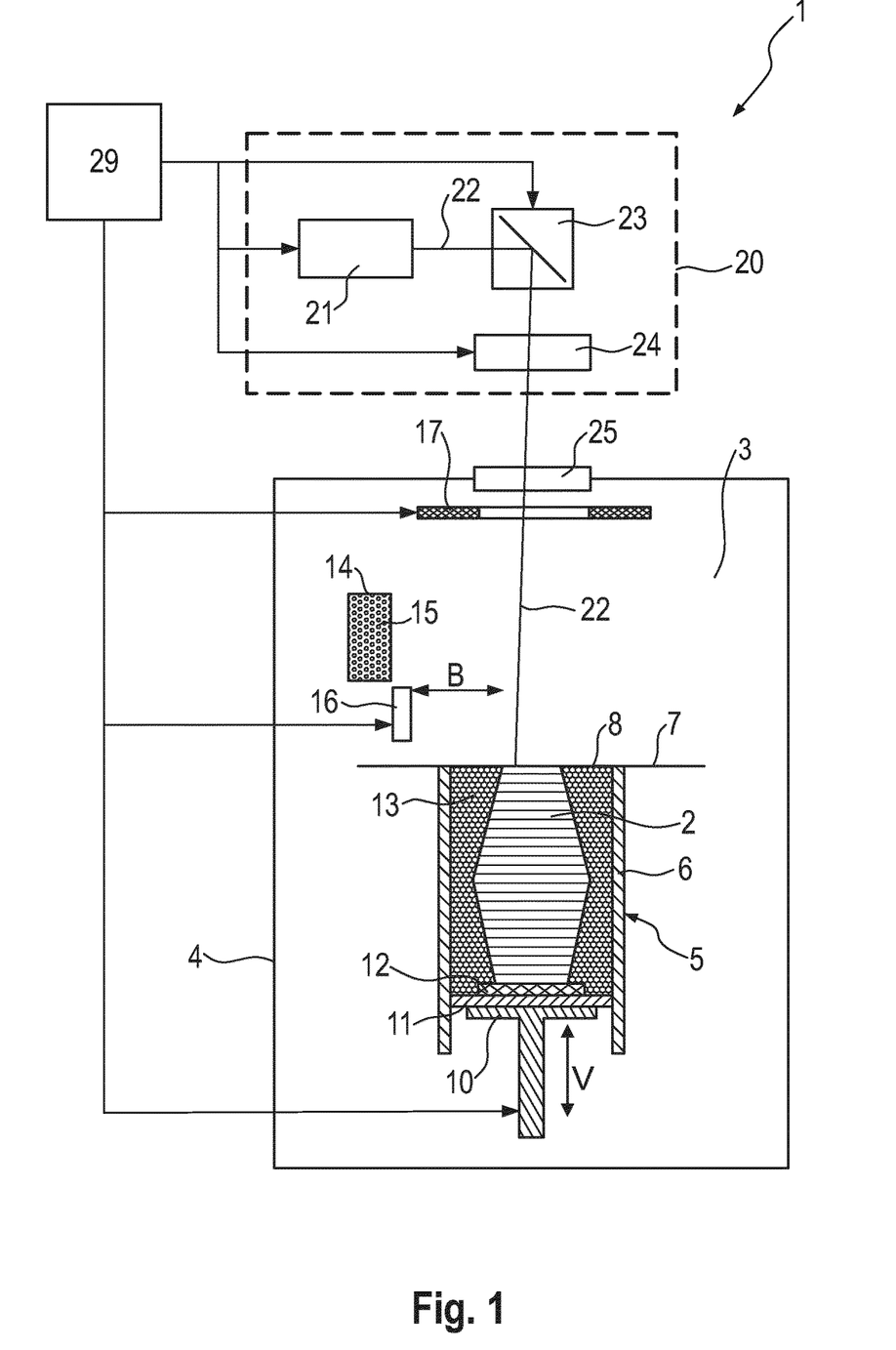
FIG. 1 shows a schematic view, partially in cross-section, of an apparatus for generatively producing a three-dimensional object according to an embodiment of the present invention.

In the following, a first embodiment of the present invention is described with reference to FIG. 1. The apparatus shown in FIG. 1 is a laser sintering or laser melting device 1. For building an object 2, it comprises a process chamber 3 having a chamber wall 4.

A container 5 open to the top and having a container wall 6 is arranged in the process chamber 3. A working plane 7 is defined by the upper opening of the container 5, wherein the area of the working plane 7 located within the opening, which can be used for building the object 2, is referred to as the build area 8.

A support 10 is arranged in the container 5, which support can be moved in a vertical direction V and to which a base plate 11 is attached that closes the container 5 to the bottom and thus forms the bottom thereof. The base plate 11 can be a plate formed separately from the support 10 and attached to the support 10, or it can be formed integrally with the support 10. Depending on the powder and process used, the base plate 11 can also have a building platform 12 attached to it as a building base, on which the object 2 is built. However, the object 2 can also be built on the base plate 11 itself, which then serves as the building base. FIG. 1 shows the object 2 to be formed in the container 5 on the building platform 12 below the working plane 7 in an intermediate state with several solidified layers surrounded by building material 13 that remained unsolidified. The vertical direction V defines the z-direction of a Cartesian coordinate system.

The laser sintering device 1 further comprises a storage container 14 for a pulverulent building material 15 that can be solidified by electromagnetic radiation, and a recoating device 16 movable in at least one direction of movement B, which is also referred to as the recoating direction, for applying the building material 15 within the build area 8. The direction of movement B is a horizontal direction in FIG. 1 and defines the x-axis of the Cartesian coordinate system, the z-direction of which is defined by the vertical direction V of the support 10. Preferably, the recoating device 16 extends transverse to its direction of movement B, i.e. in the y-direction and into the drawing plane in FIG. 1, over the entire area where powder is to be applied. The recoating device 16 comprises a powder discharge module 18, which is described in more detail below with reference to FIGS. 2, 3, 4a and 4b and is not shown in FIG. 1. Further, the recoating device 16 comprises at least one recoating element not shown in the figures, for example an application roller and/or an application blade and/or a flexible application element, such as a flexible rubber lip or a brush, for drawing out the building material 15 in powder form into a uniform layer and/or compacting an applied layer. The at least one recoating element can also be provided on the powder discharge module.

Various types of powder can be used as building material, in particular metal powder, plastic powder, ceramic powder, sand, filled, coated or mixed powders.

Optionally, a radiation heater 17 is arranged in the process chamber 3, which serves to heat the applied building material 15. For example, an infrared radiator can be provided as the radiation heater 17.

The laser sintering device 1 further comprises an irradiation device 20 having a laser 21 that generates a laser beam 22 which is deflected by a deflection device 23 and focused onto the working plane 7 by a focusing device 24 via a coupling window 25, which is provided on the upper side of the process chamber 3 in the chamber wall 4.

Furthermore, the laser sintering device 1 comprises a control unit 29 by means of which the individual components of the device 1 are controlled in a coordinated manner to implement the build process. Alternatively, the control unit can be provided partially or entirely outside of the device. The control unit can include a CPU whose operation is controlled by a computer program (software). The computer program can be stored separately from the device on a storage medium from which it can be loaded into the device, in particular into the control unit.

During operation, in order to apply a powder layer, the support 10 is first lowered by an amount that corresponds to the desired layer thickness. The recoating device 16 first moves to the storage container 14 and therefrom receives a quantity of the building material 15 sufficient for applying at least one layer into the powder discharge module 18 (not shown in FIG. 1; see, for example, FIG. 2). The recoating device 16 then moves across the build area 8, there applies pulverulent building material 15 onto the building base or onto a powder layer that is already present, and draws it out to form a powder layer. The application is carried out at least over the entire cross-section of the object 2 to be produced, preferably over the entire build area 8, i.e. the area bounded by the container wall 6. Optionally, the pulverulent building material 15 is heated to a working temperature by means of a radiation heater 17.

Subsequently, the cross-section of the object 2 to be produced is scanned by the laser beam 22, so that the pulverulent building material 15 is solidified at the positions that correspond to the cross-section of the object 2 to be produced. In this process, the powder grains are partially or completely melted at these positions by means of the energy introduced by the radiation so that, after cooling, they are present joined together as a solid body. These steps are repeated until the object 2 is completed and can be removed from the process chamber 3.

Figure 2:
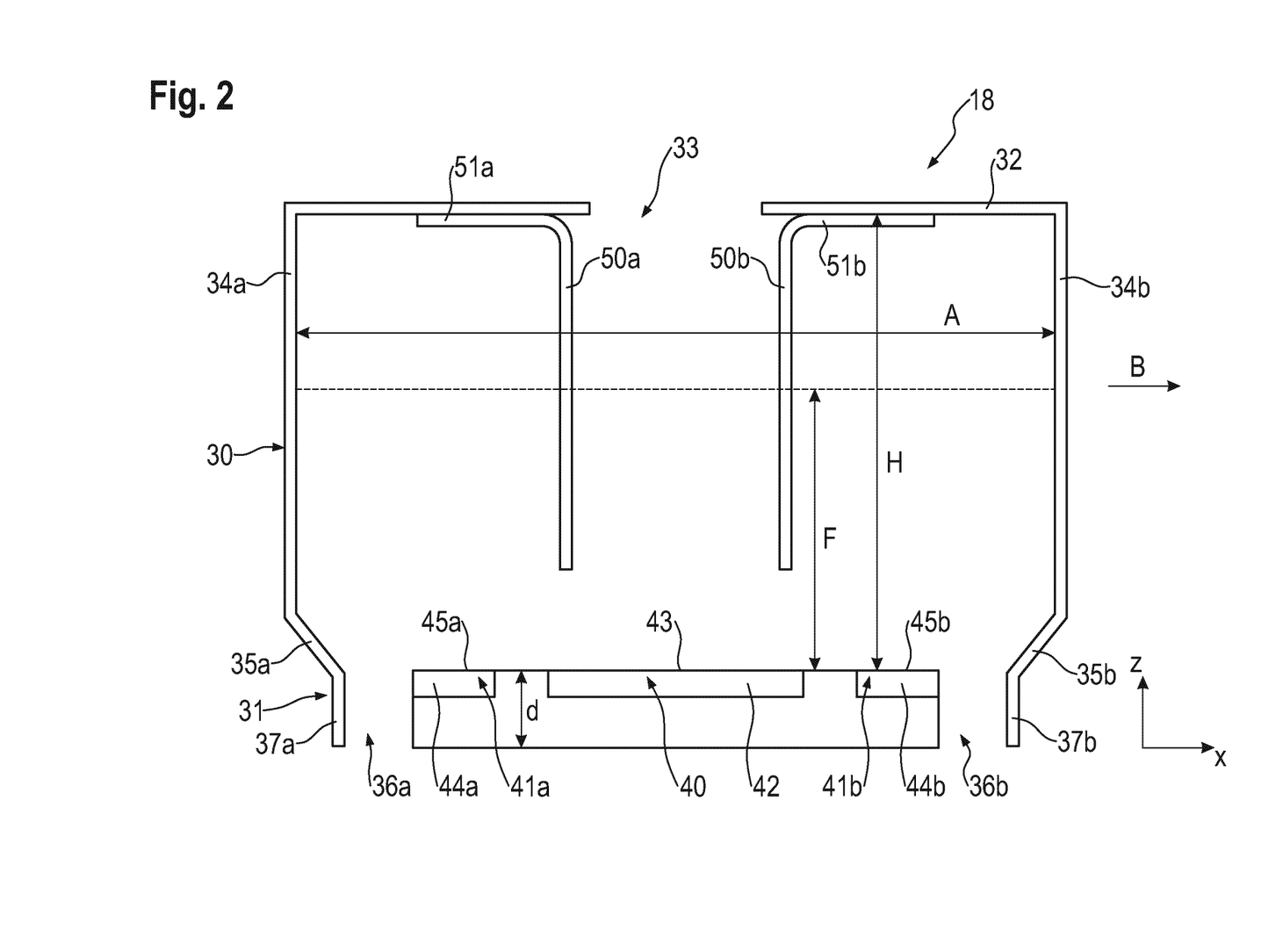
FIG. 2 shows a schematic view in cross-section of a powder discharge module of the apparatus shown in FIG. 1.
Figure 3:
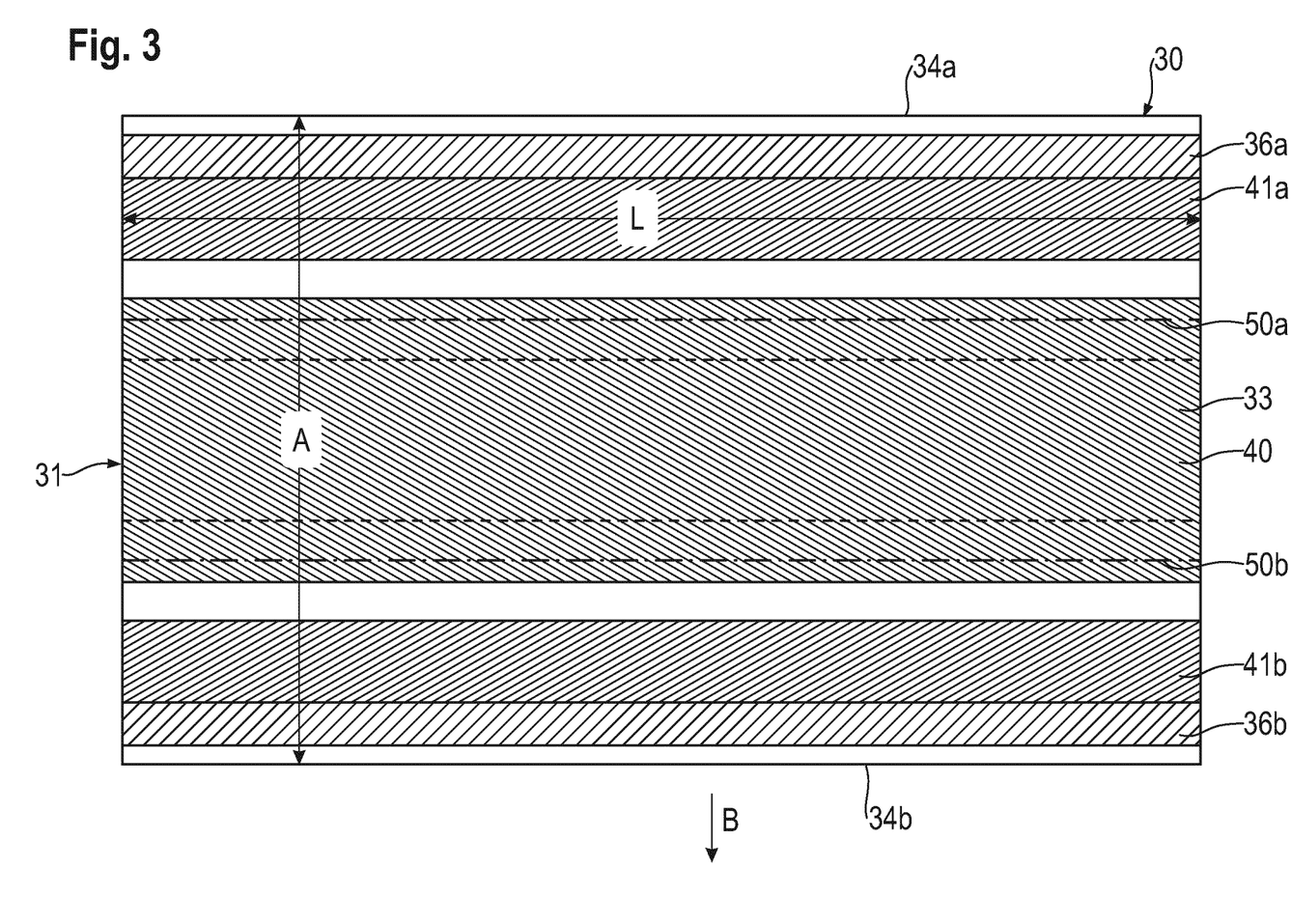
FIG. 3 shows a schematic top view of a discharge section of the powder discharge module shown in FIG. 2 from above.

In the following, an exemplary embodiment of the powder discharge module 18 of the recoating device 16 is described with reference to FIG. 2 and FIG. 3. The powder discharge module comprises a powder container 30 for receiving the building material in powder form. FIG. 2 shows a view of the powder discharge module 18 and of the powder container 30 in cross-section, the plane of the cross-section being substantially perpendicular to the working plane 7 and parallel to the direction of movement B of the recoating device 16, i.e. parallel to the x-z plane. FIG. 3 shows a top view of the discharge section or container bottom 31 of the powder container 30 from above (parallel to the x-y plane, i.e. parallel to the direction of movement B).

As can be seen in FIG. 2, the powder container 30 comprises, as the upper container region (i.e. facing away from the working plane 7 (see FIG. 1) in the intended operation), a container ceiling 32 that bounds the powder container 30 to the top and in which a supply opening 33 is provided for supplying the pulverulent building material 15 to the powder container 30. As the lower container region (i.e. facing the working plane 7 (see FIG. 1) in the intended operation), the powder container 30 comprises a discharge section, which is formed as a container bottom 31 and bounds the powder container 30 to the bottom. Laterally, the powder container 30 is bounded by a container wall, of which FIG. 2 only shows the side wall 34b located at the front in the direction of movement B and the side wall 34a located at the back in the direction of movement B. A lid, not shown in the figures, can be provided at the supply opening 33 for closing the supply opening 33.

The interior space of the powder container 30 extends between the container ceiling 32 and the container bottom 31, i.e. in the z-direction, over a height H and along the direction of movement B, i.e. in the x-direction, over a width A. Perpendicular to its height H and width A, i.e. in the y-direction, the interior space of the powder container 30 extends over a length L (see FIG. 3).

As can be seen in FIG. 2, the container bottom 31 has a thickness d in the z-direction, i.e. parallel to the height H of the interior space of the powder container 31. The thickness d is preferably smaller than the height H of the interior space of the powder container 30. Furthermore, the container bottom 31 comprises two slit-shaped discharge openings or discharge devices designed as discharge gaps 36a, 36b, each of which extends in the z-direction over the entire thickness d of the discharge section. They each form a discharge opening for discharging pulverulent building material provided in the powder container 30 downwards, i.e. in the direction of the working plane 7 (not shown in FIG. 2; see FIG. 1). Furthermore, on at least one of the discharge gaps 36a, 36b, a discharge element not shown in more detail in the figures can be provided for regulating the amount of powder discharged through the discharge gap 36a, 36b and/or for at least partially opening and/or closing the discharge gap 36a, 36b. The discharge element (not shown in the figures) can, for example, be designed as a slider and/or a (metering) roller. The two discharge gaps 36a, 36b are provided on the container bottom 31 at a distance from each other in the direction of movement B, i.e. in the x-direction. In FIG. 2, the discharge gap 36b on the right is the discharge gap located in front in the (current) direction of movement B, and the discharge gap 36a on the left is the discharge gap located behind in the (current) direction of movement B. Preferably, the discharge gaps 36b, 36a are provided at a boundary of the container bottom 31 that is located at the front and rear, respectively, in the direction of movement B.

In their regions adjacent to the container bottom 31, the side walls 34a and 34b optionally each have an inclined section 35a and 35b, respectively, which is designed as a ramp and slopes in an oblique manner towards the respective discharge gap 36a and 36b, i.e. is funnel-shaped at least in a section thereof. The inclined section 35a, 35b of the side wall 34a, 34b preferably passes into a substantially vertical wall section 37a or 37b of the container bottom 31, respectively, which delimits the respective discharge gap 36a or 36b in the direction of movement B, i.e. in the x-direction, or the opposite direction thereof. Alternatively, the inclined section 35a, 35b itself can also at least partially delimit the respective discharge gap 36a or 36b in the direction of movement B, i.e. in the x-direction, or the opposite direction thereof, i.e. the container bottom 31 can also be provided without the vertical wall section 37a or 37b.

Furthermore, the container bottom 31 comprises a first region adjacent to the discharge gap 36b located at the front in the direction of movement B, at which first region a first discharge fluidization zone 41b is provided. Further, the container bottom 31 comprises a third region adjacent to the discharge gap 36a located at the rear in the direction of movement B, at which third region a second discharge fluidization zone 41a is provided. Between the first and third regions of the container bottom 31 a second region of the container bottom 31 is provided, which is spaced from each of the discharge gaps 36a, 36b and at which a central fluidization zone 40 is provided. The first and second discharge fluidization zones 41b, 41a can be provided at a distance to the respective discharge gap 36b, 36a or can be adjacent to the respective discharge gap 36b, 36a (as shown in FIG. 2). The central fluidization zone 40 can be provided at a distance to the first and/or second discharge fluidization zone 41b, 41a (as shown in FIG. 2), or can be adjacent to the first and/or second discharge fluidization zones 41b, 41a.

The first discharge fluidization zone 41b comprises a cavity 44b formed in the container bottom 31, which is separated from the interior space of the powder container 30 by a porous plate and/or perforated plate 45b. Similarly, the second discharge fluidization zone 41a and the central fluidization zone 40 each comprise a respective cavity 44a and 42 formed in the container bottom 31, each of which is separated from the interior space of the powder container 30 by a porous plate and/or perforated plate 45a and 43, respectively. The cavities 42, 44a, 44b are each in communication with a gas supply line, not shown in FIG. 2, for supplying a gas. Preferably, the gas supply lines each comprise a control device for adjusting the volumetric flow rate of the gas flowing through the gas supply lines. Further preferably, the volumetric flow rates of the gas flowing into the cavities 42, 44a, 44b can be adjusted independent of one another by the respective control devices.

The porous plates and/or perforated plates 43, 45a, 45b each have a plurality of gas outlet openings designed or dimensioned to be permeable to the gas but not to the building material in powder form. The opening cross-sections of the gas outlet openings are thus smaller than the cross-sectional areas of the powder grains of the building material, preferably smaller, and more preferably several times smaller, than a minimum cross-sectional area of the powder grains.

Optionally, one or more discharge opening fluidization zones (not shown in FIG. 2) can be provided on at least one of the inclined sections 35a, 35b of the side walls 34a, 34b and/or on at least one of the substantially vertical wall sections 37a or 37b of the container bottom 31. A discharge opening fluidization zone preferably comprises, analogously to the discharge fluidization zones 41a, 41b and the central fluidization zone 40, a cavity (not shown in FIG. 2) formed in the inclined section 35a, 35b or the wall section 34a, 34b, respectively, which is separated from the interior space of the powder container 30 by a porous plate and/or perforated plate (not shown in FIG. 2).

During operation of a fluidization zone 40, 41a, 41b (this also includes the discharge opening fluidization zones not shown in detail in the figures), gas flows through the respective gas supply line (not shown in FIG. 2) into the respective cavity 42, 44a, 44b and then flows through the respective porous plate and/or perforated plate 43, 45a, 45b into the interior space of the powder container 30. With a sufficiently large gas volume flowing into the powder container 30, or a sufficiently large volumetric flow rate of the inflowing gas, the building material in powder form is at least locally put into a fluidized bed-like or fluid-bed-like state, i.e. is fluidized. The volumetric flow rate of the gas flowing into the powder container can preferably be adjusted by the respective control device.

Furthermore, in the powder container 30 shown in FIG. 2, two flow reduction elements are provided in the form of baffle plates or baffles 50a, 50b, which are referred to as baffles in the following. The baffles 50a, 50b are mounted in the powder container 30, preferably at the container ceiling 32, for example by means of a respective attachment portion 51a, 51b extending substantially parallel to the container ceiling 32. The baffles 50a, 50b each extend from the container ceiling 32 substantially vertically downwards, i.e. in the direction of the container bottom 31. With the powder container 30 shown in FIG. 2, the baffles 50a, 50b are each provided at a distance from the container bottom 31, i.e. they extend only over a section of the height H, for example over 70% of the height H of the interior space of the powder container 30. Alternatively, at least one of the baffles 50a, 50b can extend over the entire height H of the interior space of the powder container 30, that is, from the container ceiling 32 to the container bottom 31.

The baffles 50a, 50b are arranged spaced apart from one another in the direction of movement B in the powder container 30. In FIG. 2, the baffle 50b on the right is the baffle located in front in the (current) direction of movement B, and the baffle 50a on the left is the baffle located behind in the (current) direction of movement B. The supply opening 33 of the powder container 30 is provided between the baffles 50a, 50b in the direction of movement B. The baffles 50a, 50b are described below in more detail with reference to FIG. 4a and FIG. 4b.

FIG. 3 shows a top view of the container bottom 31 from above. As can be seen in FIG. 3, the discharge gaps 36a, 36b, the discharge fluidization zones 41a, 41b, and the central fluidization zone 40 each extend substantially in a longitudinal direction perpendicular to the direction of movement B, i.e., parallel to the length L of the interior space of the powder container 30, and over substantially the entire length L of the interior space of the powder container 30, but at least over 80% of the length L.

In a projection of the container ceiling 32 onto the container bottom 31, the supply opening 33, depicted in FIG. 3 by the area located between the dashed lines, is provided within the central fluidization zone 40. The baffles 50a, 50b are also provided within the central fluidization zone 40 in a projection onto the container bottom 31, shown in FIG. 3 by the dashed-dotted lines. However, in the projection view, at least one of the baffles 50a, 50b can also be provided outside the central fluidization zone 40 and/or at an edge of the central fluidization zone 40. As shown in FIG. 3, the supply opening 33 and the baffles 50a, 50b also each extend substantially in a longitudinal direction perpendicular to the direction of movement B, i.e. parallel to the length L of the interior space of the powder container 30, and substantially over the entire length L of the interior space of the powder container 30, but at least over 80% of the length L.

Figure 4A:
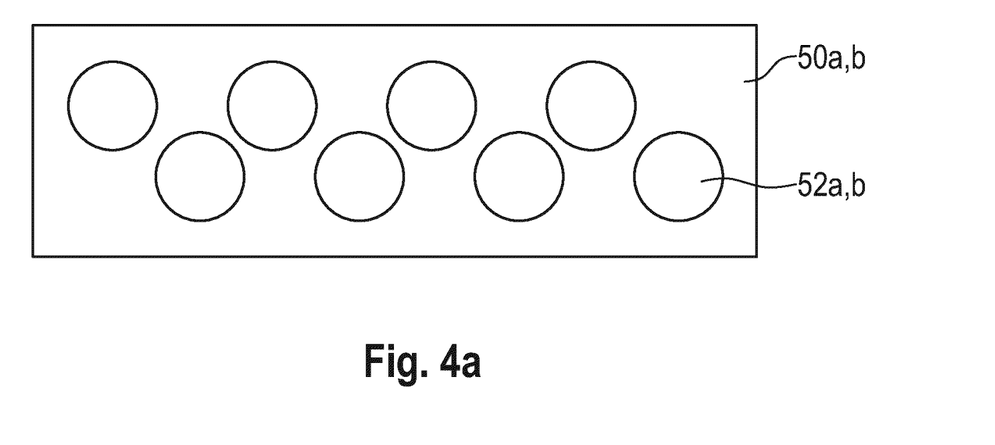
FIG. 4a shows a schematic view of a flow reduction element provided in the powder discharge module shown in FIG. 2 and FIG. 3.
Figure 4B:
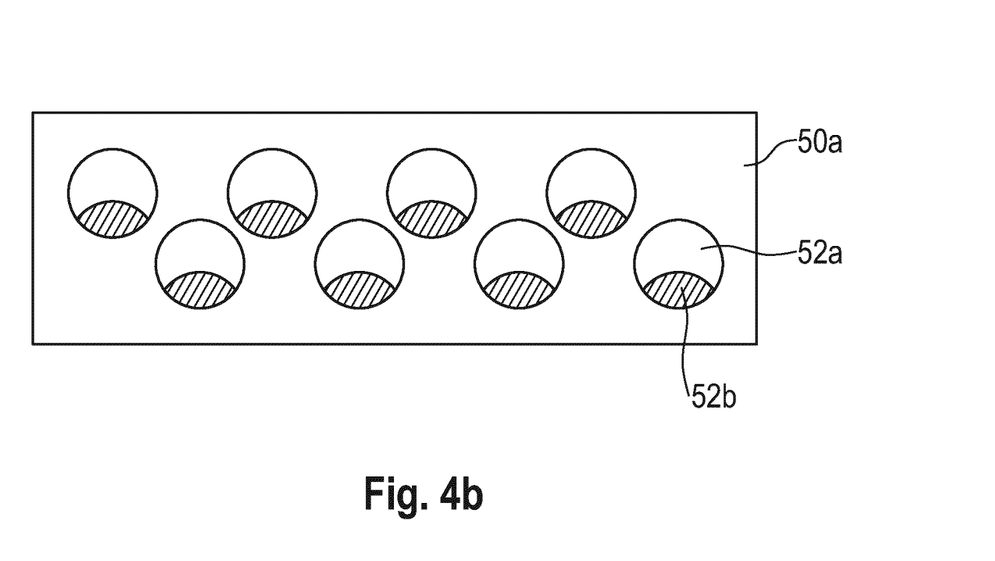
FIG. 4b shows the alignment of two flow reduction elements with respect to one another in the powder discharge module shown in FIG. 2 and FIG. 3.

In the following, the baffles 50a, 50b are described in more detail with reference to FIG. 4a and FIG. 4b. As best shown in FIG. 4a, the front baffle 50b has a plurality of powder openings 52b penetrating the baffle 50b, and the rear baffle 50a has a plurality of powder openings 52a penetrating the baffle 50a (FIG. 4a optionally shows the front baffle 50b or the rear baffle 50a). The powder openings 52a, 52b of the respective baffle 50a, 50b are in each case provided in the baffle 50a, 50b spaced at equal distance from one another. In FIGS. 4a, 4b, the powder openings 52a, 52b are arranged in two mutually offset rows of four powder openings each, but more than two rows and/or rows of more than four powder openings, for example of 15 openings, can also be provided. Also, the rows do not need to be offset from one another, or the powder openings can be arranged other than in rows or columns. Preferably, the powder openings 52a, 52b are each provided substantially over the entire extent of the baffle 50a, 50b in the direction of the height H of the powder container 30 (see FIG. 2) and substantially over the entire extent of the baffle 50a, 50b in the direction of the length L of the powder container 30 (see FIGS. 2, 3).

The powder openings 52a, 52b are designed and/or dimensioned, and arranged in the baffle 50a, 50b such that building material in powder form can pass through the powder openings 52a, 52b at least when the recoating device 16, i.e. the powder discharge module 18, is at a standstill. For example, the powder openings 52a, 52b can have an opening diameter or a maximum dimension of the opening which is at least one hundred times a grain diameter associated with the powder grains of the building material, for example a maximum grain diameter or a grain diameter of a defined characteristic value of the powder size distribution. For example, an average grain diameter of the pulverulent building material can be in the range of 50 µm, and the opening diameter or the maximum dimension of the powder openings can be in the range of 5 mm or 10 mm. The cross-sectional shape of the powder openings can be of any design, preferably the powder openings have a regular cross-sectional shape, for example circular, as shown in FIGS. 4a and 4b, or quadrangular, triangular or slit-shaped.

Furthermore, the baffles 50a, 50b are configured to at least reduce or prevent swashing of the fluidized building material during movement of the recoating device 16 or the powder discharge module 18. For this purpose, the closed areas of the baffles 50a, 50b between the powder openings 52a, 52b are sufficiently dimensioned to effect a braking effect of the fluidized building material that moves due to the acceleration of the recoating device 16 or the powder discharge module 18. For example, a ratio of the total opening area of all the powder openings 52a, 52b of a baffle 50a, 50b to the remaining closed area of the baffle 50a, 50b can be between 30% and 40%, for example 36%.

In the direction of movement B (see FIG. 2), the baffles 50a, 50b have a thickness that is several times smaller than the dimension of the baffles in the y-direction, i.e. the longitudinal direction, and in the z-direction, i.e. along the height.

As can best be seen in FIGS. 2, 3 and 4b, the baffles 50a, 50b are arranged substantially parallel to one another in the powder container 30. Furthermore, the baffles 50a, 50b are designed and arranged in the powder container 30 such that their powder openings 52a and 52b, respectively, are offset from one another at least in sections when viewed in a projection onto one another or onto a common plane. FIG. 4b shows a view of the baffle 50a located behind in the direction of movement, wherein a section of a powder opening 52b of the front baffle 50b located behind it in the view of FIG. 4b (i.e. located ahead of it in the direction of movement) is visible through each of the powder openings 52a.

The figures show baffles 50a, 50b having a plurality of powder openings 52a, 52b. Alternatively, at least one of the baffles 50a, 50b can also comprise only one single powder opening (not shown in the figures). For example, the single powder opening can be designed as a slit shaped as a serpentine line and extending, for example, in the longitudinal direction.

Optionally, the powder openings or the at least one powder opening of at least one baffle 50a, 50b are configured as adjustable and/or variable powder opening(s), i.e. the geometric shape and/or the opening area of the powder opening(s) is adjustable or variable.

Figure 5:
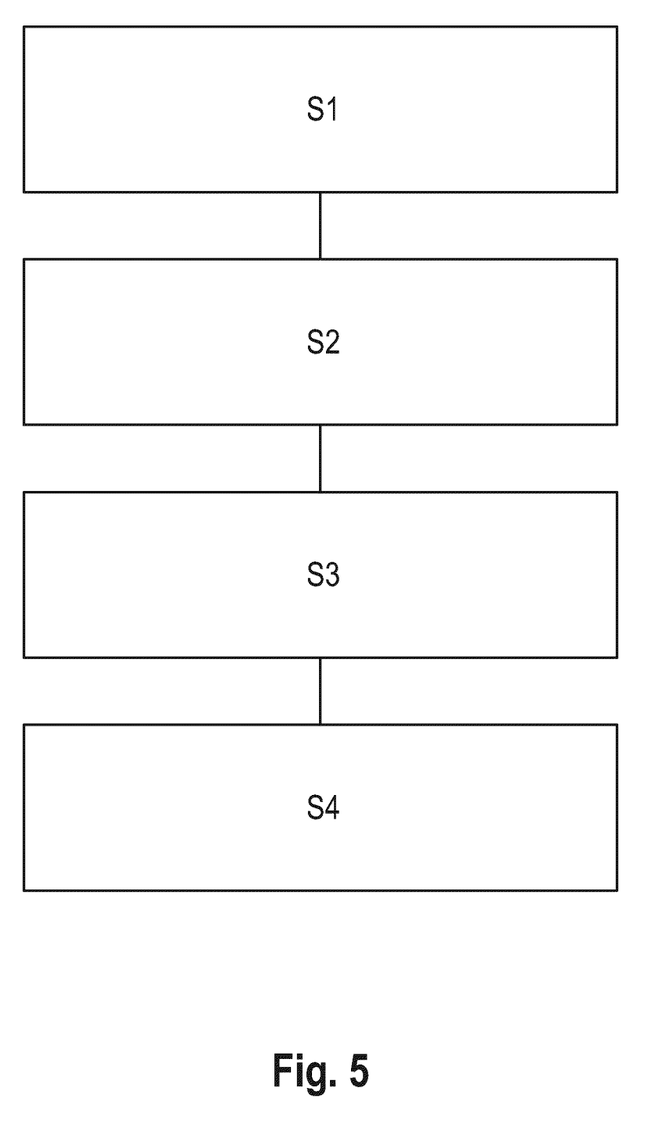
FIG. 5 is a schematic block diagram illustrating the steps of a method of applying a powder layer in the apparatus shown in FIG. 1 using the powder discharge module shown in FIGS. 2 and 3.

The application of a layer of the building material in powder form is described below with reference to FIG. 5, with reference to the previous FIGS. 1 to 4b. As already mentioned above with reference to FIG. 1, in a first step S1, which is also referred to as the filling step, the recoating device 16 first receives an amount of the building material 15 from the storage container 14 into the powder discharge module 18, which amount is sufficient for applying at least one layer. For this purpose, the lid of the supply opening 33 (not shown in the figures) is opened and the pulverulent material 15 is supplied from the storage container 14 through the supply opening 33 to the powder container 30. During the supply of the pulverulent building material, the powder container 30 is in substantially the same position below the storage container 14, which is also referred to as the filling position of the recoating device 16, i.e. the powder container 30 and the recoating device 16 do not move. The powder openings 52a, 52b of the baffles 50a, 50b are permeable to the pulverulent building material, so that the pulverulent building material spreads in the powder container 30 starting from the area of the supply opening 33. During the supply of the pulverulent building material, a gas is introduced into the powder container 30 at least through the central fluidization zone 40, preferably at least through the central fluidization zone 40 and the discharge fluidization zones 41a, 41b, more preferably also through the discharge opening fluidization zones, and the pulverulent building material is thus fluidized in the powder container 30, thus at least reducing the formation of a filling cone and facilitating a distribution of the pulverulent building material over substantially the entire width A of the powder container 30.

Preferably, building material in powder form is supplied to the powder container 30 until a predetermined filling level height of the building material in the powder container 30 is obtained. The filling level height can be detected, for example, by means of a light barrier (not shown in the figures) arranged in the powder container.

After this filling step, the recoating device 16 applies a powder layer. For this purpose, in a second step S2, the recoating device 16 is accelerated from the filling position in the direction of movement B to a, preferably predefined, travel speed. In a third step S3, the recoating device 16 moves across the build area 8 at a substantially constant speed, namely the travel speed reached at the end of the second step S2, which is preferably defined in advance, and applies building material 15 in powder form in the build area onto the building base or onto a powder layer already present, and draws it out to form a powder layer. The building material in powder form is applied by discharging the building material from the powder container 30 of the powder discharge module 18 through at least one of the discharge gaps 36a, 36b. Subsequently, in a fourth step S4, the recoating device 16 is slowed down, i.e. accelerated (negative acceleration).

During the movement of the recoating device across the build area in the third step S3, gas is introduced into the powder container 30 through at least one of the discharge fluidization zones 41a, 41b. Preferably, it is the discharge fluidization zone 41a, 41b that is located closer to the discharge gap 36a, 36b through which building material is discharged in the third step. Preferably, gas is also introduced through the discharge opening fluidization zones, which are provided at the inclined section 35a, 35b of the side wall 34a, 34b and at the substantially vertical wall section 37a, 37b of the container bottom 31, of the discharge gap 36a, 36b through which building material is discharged. For example, the gas introduced through the discharge fluidization zone and optionally through the discharge opening fluidization zones can have a volumetric flow rate substantially the same as in the filling step S1. Gas is preferably introduced through the central fluidization zone 40 in step S3 at a lower volumetric flow rate than through the discharge fluidization zones 41a, 41b and/or than in the filling step S1, or substantially no gas is introduced through the central fluidization zone 40 into the powder container 30. As a result, the pulverulent building material provided in the powder container 30 is fluidized substantially only in the region of the discharge gap 36a, 36b used to discharge the building material, or is at least more fluidized in this region. Thus, less building material is fluidized, which reduces the finest particle discharge from the pulverulent building material in the powder container 30.

At the beginning of the powder discharge through the at least one discharge gap 36a, 36b in the third step S3, preferably the volumetric flow rate of the gas introduced into the powder container through the discharge fluidization zones 41a, 41b and the discharge opening fluidization zones, preferably also of the gas introduced through the central fluidization zone 40, is increased in order to achieve an improved discharge of the building material in powder form.

In the second step S2, in which the speed of the recoating device 16 is increased, and/or in the fourth step S4, in which the speed of the recoating device 16 is reduced, the volumetric flow rate of the gas introduced into the powder container 30 through the at least one discharge fluidization zone 41a, 41b and optionally through the discharge opening fluidization zones, optionally also through the central fluidization zone 40, is reduced in order to prevent or at least reduce swashing of the pulverulent building material in the powder container 30 during the acceleration process.

With the powder discharge module 18 shown in FIG. 2, the first discharge fluidization zone 41b is provided behind the discharge gap 36b in the direction of movement B, which is the leading discharge gap in the direction of movement, and the second discharge fluidization zone 41a is provided in front of the discharge gap 36b in the direction of movement B, which discharge gap is the trailing discharge gap in the direction of movement, so that the discharge fluidization zones 41a, 41b and the central fluidization zone 40 are provided between the discharge gaps 36a, 36b in the direction of movement B. The optional discharge opening fluidization zone(s) provided on at least one inclined section 35a, 35b of a side wall 34a, 34b and/or on at least one of the substantially vertical wall sections 37a and 37b of the container bottom 31, respectively, are provided in the direction of movement B respectively in front of the leading discharge gap 36b and behind the trailing discharge gap 36a, i.e. on the side of the respective discharge gap 36a, 36b opposite the respective discharge fluidization zone 41a, 41b.

Alternatively, at least one of the discharge fluidization zones 41a, 41b can also be provided in the direction of movement B in front of the leading discharge gap 36b or behind the trailing discharge gap 36a, in particular if no discharge opening fluidization zone(s) is/are provided at the discharge gap 36a, 36b. Further fluidization zones can also be provided in the region of the container bottom 31, for example at least one of the fluidization zones can be formed by several fluidization zones formed separately from each other.

In general, the number of fluidization zones, discharge gaps, baffles, and/or of the supply opening can differ from the respective number described herein. For example, the powder container can be provided with only the central fluidization zone 40 and the discharge fluidization zones 41a, 41b. Alternatively or additionally, the powder container can include only one discharge opening, and/or can comprise only one baffle or more than two baffles and/or more than one, for example two, supply openings. The powder container can also be provided without baffles.

The inclined sections 35a and 35b of the side walls 34a and 34b described above with reference to FIG. 2, which can each comprise a discharge opening fluidization zone, can alternatively or in addition be formed as inclined sections of the respective discharge gap 36a, 36b itself. Further inclined or at least sectionally funnel-shaped regions can also be provided. The container bottom 31, which in FIG. 1 has a substantially flat surface facing the interior space of the powder container 31, can for example also be designed to slope towards the discharge gaps 36a, 36b, i.e. as an inclined section. Accordingly, the porous plates and/or perforated plates 45a, 45b in FIG. 2 can, for example, have a section sloping downward to the respective discharge gap 36a, 36b.

In general, such inclined sections are preferably formed without edges to any non-inclined or flat sections, e.g. by means of a suitable rounding.

In the embodiment described above, the flow reduction element(s) are in the form of baffles or baffle plates, i.e. as flat elements penetrated by at least one powder opening. Alternatively or in addition, flow reducing structures other than the powder openings described above can also be provided at the flow reduction element(s), e.g. one or more ribs and/or lamellas.

Although the present invention has been described with reference to a laser sintering or laser melting device, it is not limited to laser sintering or laser melting. It can be applied to any method of generatively manufacturing a three-dimensional object by layer-wise application and selective solidification of a building material in powder form.

For example, the irradiation device can comprise one or more gas or solid-state lasers or any other type of laser, such as laser diodes, in particular VCSEL (Vertical Cavity Surface Emitting Laser) or VECSEL (Vertical External Cavity Surface Emitting Laser), or a line of such lasers. In general, any device that can selectively apply energy as wave or particle radiation onto a layer of the building material can be used as an irradiation device. For example, instead of a laser, another light source, an electron beam, or any other energy or radiation source suitable for solidifying the building material can be used. Instead of deflecting a beam, exposure with a movable line irradiation device can also be applied. The invention can also be applied to selective mask sintering, in which an extended light source and a mask are used, or to high-speed sintering (HSS), in which a material that increases (absorption sintering) or decreases (inhibition sintering) the radiation absorption at the corresponding positions is selectively applied to the building material and is then irradiated non-selectively over a large area or by a movable line irradiation device.

Instead of introducing energy, the selective solidification of the applied building material can also be performed by 3D printing, for example by applying an adhesive. In general, the invention relates to the additive manufacturing of an object by means of layer-wise application and selective solidification of a building material in powder form, irrespective of the manner in which the building material is solidified.

The invention claimed is:

1. A powder discharge module for a recoating device of an apparatus for additively manufacturing a three-dimensional object by layer-wise applying building material in powder form and selectively solidifying applied layers of the building material at positions corresponding to a respective cross-section of the three-dimensional object in a respective layer, wherein for the layer-wise applying of the building material the recoating device is provided in the apparatus so as to be movable in at least one direction of movement across a working plane of the apparatus, the powder discharge module comprising:
a powder container that forms a chamber for receiving the building material in powder form, the powder container comprises:
a supply opening for supplying the building material in powder form to the chamber of the powder container;
a discharge section facing the working plane during intended operation of the recoating device, the discharge section having at least a first discharge device for discharging the building material in powder form from the chamber and at least one fluidization zone for fluidizing the building material in powder form using a gas in the chamber, and at least a first flow reduction element and a second flow reduction element provided in the chamber, wherein the first and second flow reduction elements both extend from a ceiling of the powder container towards the discharge section and end at a distance from the discharge section.

2. The powder discharge module according to claim 1, wherein the powder container comprises the first flow reduction element at at least one upper container region, the first flow reduction element extending substantially from the at least one upper container region toward the discharge section, and/or wherein the first flow reduction element extends at least over 50% of a distance of the upper container region from the discharge section and/or wherein the first flow reduction element is provided in the powder container at a distance from the discharge section.

3. The powder discharge module according to claim 1, wherein the first flow reduction element extends substantially in a longitudinal direction transverse to an intended direction of movement of the recoating device.

4. The powder discharge module according to claim 1, wherein the first flow reduction element comprises a plurality of structures that include one or a plurality of powder opening(s) penetrating the first flow reduction element.

5. The powder discharge module according to claim 1, the second flow reduction element having an orientation corresponding to an orientation of the first flow reduction element.

6. A powder discharge module for a recoating device of an apparatus for additively manufacturing a three-dimensional object by layer-wise applying building material in powder form and selectively solidifying applied layers of the building material at positions corresponding to a respective cross-section of the three-dimensional object in a respective layer, wherein for the layer-wise applying of the building material the recoating device is provided in the apparatus so as to be movable in at least one direction of movement across a working plane of the apparatus, the powder discharge module comprising:

a powder container for receiving the building material in powder form, and the powder container comprises:

a supply opening for supplying the building material in powder form to the powder container;

a discharge section facing the working plane during intended operation of the recoating device, the discharge section comprising at least a first discharge device for discharging the building material in powder form and at least one fluidization zone for fluidizing the building material in powder form using a gas in the powder container;

at least a first flow reduction element; and at least a second flow reduction element having an orientation corresponding to an orientation of the first flow reduction element, wherein the first flow reduction element and the second flow reduction element each comprise a plurality of structures that include one or a plurality of powder opening(s) penetrating the first flow reduction element; and wherein the first flow reduction element and the second flow reduction element are designed and/or arranged in the powder container so that in a projection of the first flow reduction element onto the second flow reduction element the powder opening(s) of the first flow reduction element and the second flow reduction element are offset from one another at least in sections thereof.

7. The powder discharge module according to claim 1, further comprising:

a first discharge fluidization zone provided in a first region of the discharge section, the first region being a region of the discharge section adjacent to the first discharge device, the first discharge fluidization zone fluidizing the building material in powder form using a gas in the powder container; and/or a central fluidization zone provided in a second region of the discharge section, the second region being a region of the discharge section spaced from the first discharge device, the central fluidization zone fluidizing the building material in powder form using a gas in the powder container.

8. The powder discharge module according to claim 7, wherein the powder container further comprises at least one upper container region at which the supply opening is provided, and wherein in a projection of the at least one upper container region onto the discharge section, the supply opening is provided substantially in a region of the central fluidization zone.

9. The powder discharge module according to claim 7, wherein the discharge section further comprises a second discharge device, and further comprising a second discharge fluidization zone in a third region of the discharge section, the third region being a region of the discharge section adjacent to the second discharge device, the second discharge fluidization zone fluidizing the building material in powder form using a gas in the powder container.

10. The powder discharge module according to claim 7, wherein at least one of the first discharge fluidization zone and the central fluidization zone comprises a control device for adjusting a volumetric flow rate through the at least one fluidization zone.

11. An apparatus for additively manufacturing a three-dimensional object by layer-wise applying building material in powder form and selectively solidifying the applied layer at positions that correspond to the respective cross-section of the three-dimensional object in the respective layer, comprising a recoating device which is provided in the apparatus so as to be movable in at least one direction of movement across a working plane of the apparatus in order to layer-wise apply the building material, wherein the recoating device comprises a powder discharge module according to claim 1.

12. A powder discharge module for a recoating device of an apparatus for additively manufacturing a three-dimensional object by layer-wise applying building material in powder form and selectively solidifying applied layers of the building material at positions corresponding to a respective cross-section of the three-dimensional object in a respective layer, wherein for the layer-wise applying of the building material the recoating device is provided in the apparatus so as to be movable in at least one direction of movement across a working plane of the apparatus, the powder discharge module comprising:

a powder container for receiving the building material in powder form, the powder container comprises:

a supply opening for supplying the building material in powder form to the powder container; and a discharge section facing the working plane during intended operation of the recoating device, the discharge section having at least a first discharge device for discharging the building material in powder form and at least one fluidization zone for fluidizing the building material in powder form using a gas in the powder container, and at least a first flow reduction element provided in the powder container, wherein the first flow reduction element extends from a ceiling of the powder container towards the discharge section and ends at a distance from the discharge section, and wherein the first flow reduction element comprises a plurality of structures that include one or a plurality of powder opening(s) penetrating the first flow reduction element.

\* \* \* \* \*